(12) United States Patent
Sun et al.

(10) Patent No.: US 9,903,547 B2
(45) Date of Patent: Feb. 27, 2018

(54) LIGHT BAR ASSEMBLY AND BACKLIGHT

(71) Applicants: BOE TECHNOLOGY GROUP CO., LTD., Beijing (CN); HEFEI BOE DISPLAY LIGHT CO., LTD., Hefei, Anhui (CN)

(72) Inventors: Wenbo Sun, Beijing (CN); Wei Wang, Beijing (CN); Tongmin Liu, Beijing (CN); Qiping Zhang, Beijing (CN); Xing Wang, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 287 days.

(21) Appl. No.: 14/744,569

(22) Filed: Jun. 19, 2015

(65) Prior Publication Data

US 2016/0195248 A1    Jul. 7, 2016

(30) Foreign Application Priority Data

Jan. 4, 2015 (CN) .................... 2015 2 0002749 U

(51) Int. Cl.
| | |
|---|---|
| *F21V 19/00* | (2006.01) |
| *F21S 4/00* | (2016.01) |
| *G02F 1/1335* | (2006.01) |
| *F21S 4/24* | (2016.01) |
| *G02B 6/26* | (2006.01) |

(52) U.S. Cl.
CPC ............. *F21S 4/006* (2013.01); *F21S 4/24* (2016.01); *G02F 1/133608* (2013.01); *G02B 6/26* (2013.01)

(58) Field of Classification Search
CPC .......... G02B 6/26; G02B 6/262; G02B 6/266; G02B 6/268; G02F 1/133608
USPC ................................. 362/97.1–97.4
See application file for complete search history.

(56) References Cited

U.S. PATENT DOCUMENTS

| | | | |
|---|---|---|---|
| 5,493,481 A * | 2/1996 | Wiegand | F21S 2/00 362/243 |
| 2012/0106197 A1* | 5/2012 | Lai | B32B 37/12 362/609 |
| 2012/0236538 A1* | 9/2012 | Hu | G09F 13/04 362/97.1 |
| 2013/0093981 A1* | 4/2013 | Yu | G02F 1/133615 349/65 |

(Continued)

*Primary Examiner* — Anabel Ton
(74) *Attorney, Agent, or Firm* — Nath, Goldberg & Meyer; Joshua B. Goldberg

(57) ABSTRACT

The present invention discloses a light bar assembly and a backlight. The light bar assembly includes a light bar and a light bar fixing tape arranged on a back surface of the light bar, wherein the light bar fixing tape includes a main body part and multiple extension parts extending out from the main body part, the main body part is used for being attached to a flexible printed circuit board on the light bar, and the multiple extension parts are used for being attached to a backplane of a backlight to be assembled. The backlight includes a backplane and the light bar assembly, multiple through holes one-to-one corresponding to the positions of the multiple extension parts are formed on the backplane, and each extension part can penetrate through the corresponding through hole and be attached to the back surface of the backplane.

20 Claims, 4 Drawing Sheets

(56) References Cited

U.S. PATENT DOCUMENTS

| | | | |
|---|---|---|---|
| 2014/0071713 A1* | 3/2014 | Liao | G02F 1/1335 362/627 |
| 2014/0153280 A1* | 6/2014 | Lee | G02B 5/23 362/606 |
| 2014/0176867 A1* | 6/2014 | Huang | G02B 6/0081 349/65 |
| 2014/0198522 A1* | 7/2014 | Hsiao | G02B 6/0091 362/606 |

* cited by examiner

LIGHT BAR ASSEMBLY AND BACKLIGHT

FIELD OF THE INVENTION

The present invention relates to the field of display technology, and in particular relates to a light bar assembly and a backlight including the light bar assembly.

BACKGROUND OF THE INVENTION

A liquid crystal display mainly includes a liquid crystal display panel and a backlight. According to the category of light sources, backlights can be divided into light emitting diode (LED) backlights and cold cathode fluorescent lamp (CCFL) backlights. In recent years, the light emitting diode backlights become the best choice in the field of liquid crystal display due to its excellent optical effect and low cost.

In order to obtain an optimal optical effect, a bent part is often arranged on the light source installation position of a backplane of an existing backlight with a small and medium size. FIG. 1 is a schematic diagram of a structure of the existing backlight, and FIG. 2 is an enlarged view of a part A in FIG. 1. As shown in FIG. 1 and FIG. 2, the backplane 1 includes a flat panel part (not shown in FIG. 1 and FIG. 2) and a bent part 11 arranged on the flat panel part and bent towards the central area of the flat panel part, a reflective tape 2 is arranged on the inner side of the bent part 11, and a light bar 4 is fixed at the edge (namely, the edge close to the bent part 11 of the flat panel part) of the flat panel part through a light bar fixing tape 3. The light bar fixing tape 3 is usually divided into two segments, one segment is attached to a flexible printed circuit board of the light bar 4 after a release film is torn off, and the other segment is attached to the edge of the flat panel part after a release film is torn off, to fix the light bar 4.

In an assembly process of the backlight, the reflective tape 2 is attached to the inner side of the bent part 11 at first, and then the light bar 4 attached with the light bar fixing tape 3 (at this time, the release film on the segment to be attached to the edge of the flat panel part of the light bar fixing tape 3 is not torn off) is foisted into an area defined by the bent part 11 and the flat panel part.

FIG. 3 is a sectional view of the area defined by the bent part 11 and the flat panel part after the light bar 4 is attached. A strict requirement is proposed on the adhesion position of the light bar 4 on the edge of the flat panel part, if the light bar is attached to a wrong position, the optical effect and the brightness of the backlight are influenced. Therefore, in a process of tearing off the release film on the segment of the light bar fixing tape 3 to be attached to the edge of the flat panel part, the light bar 4 often needs to be fixed by a jig to ensure the accurate position thereof on the edge of the flat panel part. However, in the process of fixing the light bar 4 via the jig, the strength of an applied force is hard to be controlled, if the strength of the force is too weak, the position of the light bar 4 may deviate from the ideal position; if the strength of the force is too strong, light emitting diodes on the light bar 4 may be damaged. Further, in a process of detaching the light bar 4 to repair the backlight, the light bar 4 is liable to be torn and the flexible printed circuit board is liable to deform, and this results in severe loss.

Based on what is mentioned above, in the assembly process of the backlight, the fixing manner of the light bar still needs to be perfected.

SUMMARY OF THE INVENTION

One purpose of the present invention is to provide a light bar assembly and a backlight, for solving the technical problems of inaccurate positioning, low assembly efficiency and high damage possibility of a light bar in an assembly process of the existing backlight.

To solve the above technical problems, as a first aspect of the present invention, a light bar assembly is provided, including a light bar and a light bar fixing tape arranged on the back surface of the light bar, wherein the light bar fixing tape includes a main body part and a plurality of extension parts extending out from the main body part, the main body part is used for being attached to a flexible printed circuit board on the light bar, the plurality of extension parts are used for being attached to a backplane of a backlight to be assembled, the light bar fixing tape further includes a main body part release film and a plurality of extension part release films, which are mutually independent, the main body part release film is arranged on the surface of the main body part to be attached to the flexible printed circuit board, and the plurality of extension part release films are respectively arranged on the surfaces of the plurality of extension parts to be attached to the backplane.

Preferably, the main body part is strip-shaped, and the width of the main body part is equal to the width of the flexible printed circuit board.

Preferably, grabbing parts are arranged on the main body part release film and the plurality of extension part release films, respectively.

Preferably, the plurality of extension parts are uniformly distributed at preset intervals on a same side of the main body part.

Preferably, each extension part is provided with a chamfered structure at the junction of the extension part and the main body part.

As a second aspect of the present invention, a backlight is further provided, wherein the backlight includes a backplane and the above-mentioned light bar assembly provided by the present invention, a plurality of through holes one-to-one corresponding to the positions of the plurality of extension parts are formed on the backplane, and each extension part can penetrate through the corresponding through hole and be attached to the back surface of the backplane.

Preferably, the backplane includes a flat panel part and a bent part arranged on the flat panel part and bent towards the central area of the flat panel part, the bent part includes a first side wall and a second side wall, the first side wall is connected with the flat panel part, and the second side wall is connected with the first side wall, such that the flat panel part, the first side wall and the second side wall define a groove-shaped area together, the plurality of through holes are formed at positions on the edge of the flat panel part close to the bent part, and the light bar is located in the groove-shaped area.

Preferably, the shortest distance from the edge of each through hole close to the first side wall to the bottom of the first side wall is the same, and the distance is equal to the width of the main body part and the width of the flexible printed circuit board.

Preferably, each through hole is a rectangle with a first length and a first width, each extension part is a rectangle with a second length and a second width, the second length is smaller than the first length, and the second width is smaller than the first width.

Preferably, the first length is 5.0-5.5 mm, the first width is 5.0-5.5 mm, the second length is 4.5-5.0 mm, and the second width is 4.5-5.0 mm Preferably, each extension part includes two opposite side edges, and the distances from the two side edges to the corresponding inner edges of the corresponding through hole are equal to each other.

According to the present invention, the plurality of extension parts on the light bar fixing tape are respectively matched with the plurality of through holes on corresponding positions on the backplane to fix the light bar on the backplane. Compared with the prior art, the light bar in the present invention is positioned more accurately and conveniently, and the assembly efficiency of the backlight is improved. In addition, under the condition that the light bar needs to be detached to repair the backlight, by adopting the present invention, the damage risk of the light bar can be greatly reduced and the cost is saved.

BRIEF DESCRIPTION OF THE DRAWINGS

Accompanying drawings are used for providing further understanding of the present invention, constitute a part of the description, and are used for explaining the present invention together with the following specific implementations rather than limiting the present invention, in the drawings.

DETAILED DESCRIPTION OF THE EMBODIMENTS

A detailed illustration of the specific implementations of the present invention will be given below in conjunction with the accompanying drawings. It should be understood that, the specific implementations described herein are merely used for illustrating and explaining the present invention, rather than limiting the present invention.

Figure 1:
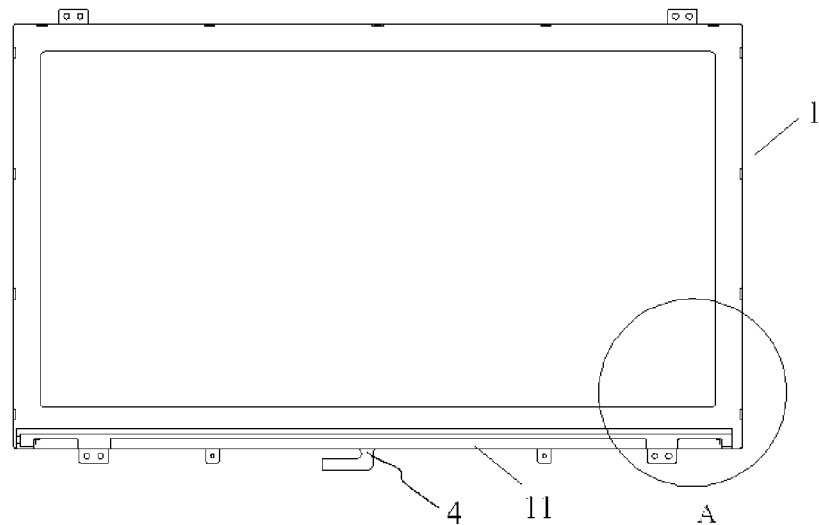
FIG. 1 is a schematic diagram of a structure of an existing backlight.
Figure 2:
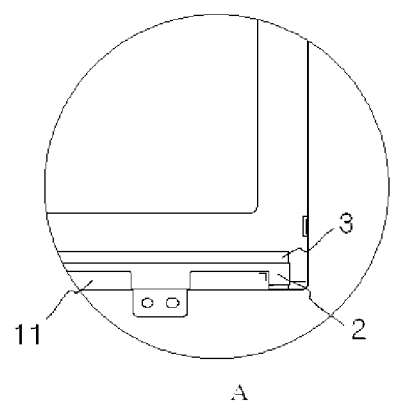
FIG. 2 is an enlarged view of a part A in FIG. 1.
Figure 3:
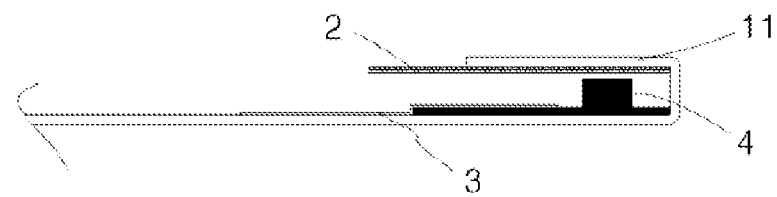
FIG. 3 is a sectional view of an area defined by a bent part and a flat panel part of the existing backlight.
Figure 4:
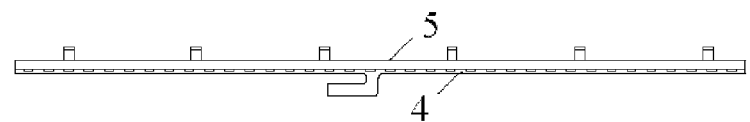
FIG. 4 is a schematic diagram of a structure of a light bar assembly in an embodiment of the present invention.

The embodiment of the present invention provides a light bar assembly at first, FIG. 4 is a schematic diagram of a structure of the light bar assembly, and as shown in FIG. 4, the light bar assembly includes a light bar 4 and a light bar fixing tape 5 arranged on the back surface of the light bar 4.

Figure 5:
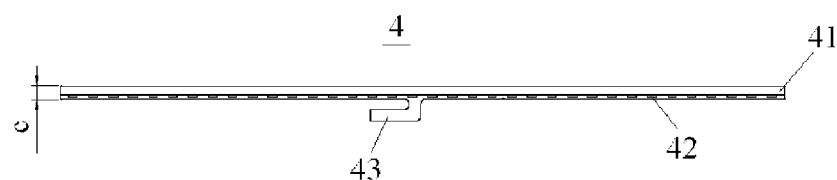
FIG. 5 is a schematic diagram of a structure of a light bar.

FIG. 5 is a schematic diagram of a structure of the light bar 4. As shown in FIG. 5, the light bar 4 includes a flexible printed circuit 41, a plurality of light emitting diodes 42 arranged on the flexible printed circuit 41 and a conductive contact piece 43, wherein one end of the conductive contact piece 43 is connected with the flexible printed circuit 41, and the other end of the conductive contact piece 43 is connected with a power supply element.

Figure 6:
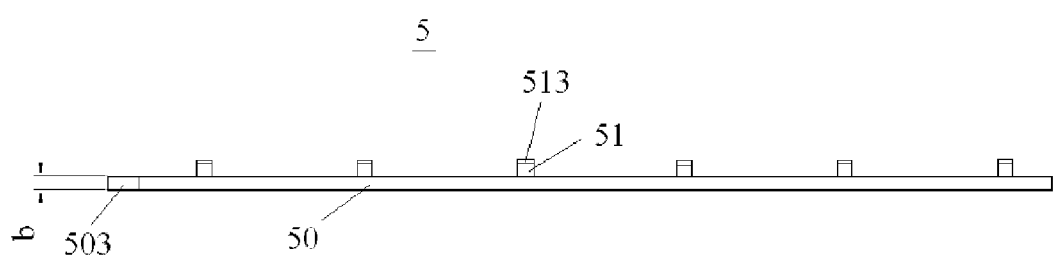
FIG. 6 is a planar schematic diagram of a light bar fixing tape.

FIG. 6 is a planar schematic diagram of the light bar fixing tape 5. As shown in FIG. 6, the light bar fixing tape 5 includes a main body part 50 and a plurality of extension parts 51 extending out from the main body part 50. The main body part 50 is used for being attached to the flexible printed circuit board 41 on the light bar 4, and the extension parts 51 are used for being attached to a backplane of a backlight to be assembled.

Further, the light bar fixing tape 5 further includes a main body part release film 503 and a plurality of extension part release films 513, which are mutually independent. Specifically, the main body part release film 503 is arranged on the surface of the main body part 50 to be attached to the flexible printed circuit board 41, and the plurality of extension part release films 513 are respectively arranged on the surfaces of the plurality of extension parts 51 to be attached to the backplane, the main body part 50 is corresponding to the main body part release film 503, and the plurality of extension parts 51 are one-to-one corresponding to the plurality of extension part release films 513. In general, a grabbing part is arranged on each release film, therefore the size of the release film in a certain direction is larger than the size of the light bar fixing tape, and when the release film is torn off, an operator can easily tear off the release film by grabbing the grabbing part. In the embodiment of the present invention, grabbing parts are arranged on the main body part release film 503 and the plurality of extension part release films 513, respectively, as shown in FIG. 6.

When the backlight is assembled, a plurality of alignment marks respectively corresponding to the plurality of extension parts 51 may be arranged on the backplane of the backlight, and the plurality of extension parts 51 are one-to-one corresponding to the plurality of alignment marks on the backplane to improve the aligned attachment precision of the light bar 4.

In the embodiment of the present invention, the main body part 50 and the plurality of extension parts 51 are respectively provided with the independent release films, and when needing to attach the part to a corresponding position, the release film corresponding to the position is torn off, so that unnecessary pollution to the light bar fixing tape 5 in the assembly process can be avoided, and the reduction of the fixing performance of the light bar fixing tape 5 is avoided.

Figure 7:
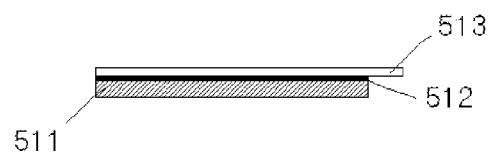
FIG. 7 is a side view of an extension part on a light bar fixing tape.

FIG. 7 is a side view of the extension part 51 of the light bar fixing tape 5. It can be seen from FIG. 7 that, the extension part 51 includes a base material 511 and colloid 512, and the base material 511 and the extension part release film 513 are respectively arranged at both sides of the colloid 512. Correspondingly, the main body part 50 includes a base material 511 and colloid 512, and the base material 511 and the main body part release film 503 are respectively arranged at both sides of the colloid 512.

Preferably, to ensure a simpler and more convenient subsequent assembly process of the backlight, the main body part 50 of the light bar fixing tape 5 is strip-shaped, and the width b (as shown in FIG. 6) of the main body part 50 is equal to the width c (as shown in FIG. 5) of the flexible printed circuit board 41 of the light bar 4, such that when the light bar 4 is arranged on the light bar fixing tape 5, the side face of the flexible printed circuit board 41 is flush with the side face of the main body part 50. In addition, to simplify the processing technology of the light bar fixing tape 5, the plurality of extension parts 51 are preferred to be uniformly distributed at preset intervals on a same side of the main body part 50.

Figure 8:
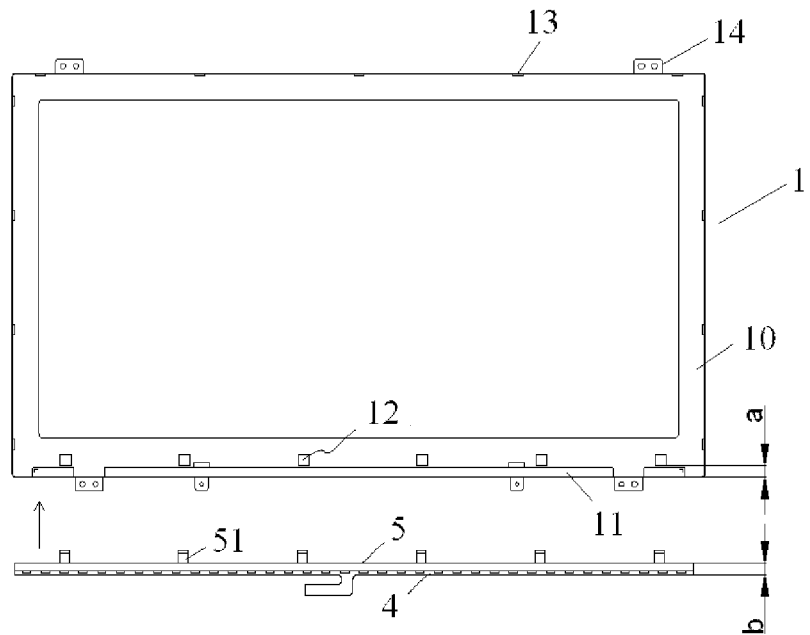
FIG. 8 is a schematic diagram of assembly of a backlight in an embodiment of the present invention.

The embodiment of the present invention further provides a backlight, and FIG. 8 is a schematic diagram of assembly of the backlight. As shown in FIG. 8, the backlight includes a backplane 1 and the above-mentioned light bar assembly provided by the embodiment of the present invention, a plurality of through holes 12 one-to-one corresponding to the positions of the plurality of extension parts 51 are formed on the backplane 1, and each extension part 51 can penetrate through the corresponding through hole 12 and be attached to the back surface of the backplane 1.

According to the embodiment of the present invention, the plurality of extension parts 51 on the light bar fixing tape 5 are respectively matched with the plurality of through holes 12 on corresponding positions on the backplane 1 to fix the light bar 4 on the backplane 1. Compared with the prior art, the light bar 4 in the embodiment of the present invention is positioned more accurately and conveniently, and the assembly efficiency of the backlight is improved. In addition, under the condition that the light bar 4 needs to be detached to repair the backlight, by adopting the embodiment of the present invention, the damage risk of the light bar 4 can be greatly reduced and the cost is saved.

Further, the backplane 1 includes a flat panel part 10 and a bent part 11 arranged on the flat panel part 10 and bent towards the central area of the flat panel part, specifically, the bent part 11 includes a first side wall and a second side wall, wherein the first side wall is connected with the flat panel part 10, and the second side wall is connected with the first side wall, such that the flat panel part 10, the first side wall of the bent part 11 and the second side wall of the bent part 11 define a groove-shaped area together. In general, the plurality of through holes 12 are formed at positions on the edge of the flat panel part 10 close to the bent part 11, and the light bar 4 is located in the groove-shaped area.

As mentioned above, in the prior art, with respect to the backlight with the bent part 11, the fixing manner of the light bar 4 is relatively complicated, a jig is needed for positioning the light bar, and the light bar 4 is liable to be damaged when tearing off the release film. However, in the embodiment of the present invention, each extension part 51 is matched with the corresponding through hole 12 to play a positioning role, thus no other tool is necessary for positioning. Moreover, since the plurality of extension parts 51 attached to the backplane 1 are dispersively distributed, and compared with the prior art, the area of the release film to be torn off is greatly reduced, the damage risk of the light bar 4 is greatly reduced. Therefore, the embodiment of the present invention is particularly suitable for the backlight with the bent part 11 on the backplane 1.

Preferably, the shortest distance from the edge of each through hole 12 close to the first side wall of the bent part 11 to the bottom of the first side wall of the bent part 11 is the same. For example, in FIG. 8, the shortest distance from the edge of each through hole 12 close to the first side wall of the bent part 11 to the bottom of the first side wall of the bent part 11 is a. Moreover, the distance a is equal to the width b of the main body part 50 of the light bar fixing tape 5, as shown in FIG. 8.

As mentioned above, the width c of the flexible printed circuit 41 of the light bar 4 is equal to the width b of the main body part 50 of the light bar fixing tape 5, then the boundaries of the main body part 50 of the light bar fixing tape 5 and the plurality of extension parts 51 can be used as the positioning marks of the light bar 4, when the boundaries are overlapped with the edges of all the through holes 12 close to the first side wall of the bent part 11, it indicates that the light bar 4 has been accurately aligned in the vertical direction as shown in FIG. 8.

In the embodiment of the present invention, the specific shapes of each through hole 12 and each extension part 51 are not limited, as long as each extension part 51 can penetrate through the corresponding through hole 12 and be attached to the back surface of the backplane 1.

For convenience of processing and manufacturing, the shapes of each through hole 12 and each extension part 51 are preferably rectangles. Specifically, each through hole 12 is a rectangle with a first length and a first width, and each extension part 51 is a rectangle with a second length and a second width. Moreover, the second length is smaller than the first length, and the second width is smaller than the first width, such that each extension part 51 can successfully penetrate through the corresponding through hole 12.

Based on the structure of the backplane of the existing backlight with a small and medium size, preferably, the first length is 5.0-5.5 mm and the first width is 5.0-5.5 mm Correspondingly, the second length is 4.5-5.0 mm, and the second width is 4.5-5.0 mm. Namely, when each extension part 51 is aligned with the corresponding through hole 12 in a centering manner, the distances from two opposite side edges of each extension part 51 to corresponding inner edges of the corresponding through hole 12 are equal to each other and are 0.25 mm, such that each extension part 51 is turned over and attached to the back surface of the backplane 1 after penetrating through the corresponding through hole 12.

Further, to prevent the light bar fixing tape 5 from being torn at the junction of the extension part 51 and the main body part 50, the root of the extension part 51 connected with the main body part 50 is designed into a chamfered structure at the junction to increase the structural strength.

In addition, a plurality of hooks 13 may be arranged on the surrounding of the backplane 1 of the backlight for fixing an optical module. A plurality of parts 14 for fixing may also be arranged on the surrounding of the backplane 1 for fixing the backlight with other components of a display.

In the embodiment of the present invention, the specific steps of installing the light bar assembly with the backplane are as following steps 1-4.

Step 1. the main body part release film 503 corresponding to the main body part 50 on the light bar fixing tape 5 is torn off. For convenience of tearing, a grabbing part exceeding the main body part 50 for about 10 mm is generally arranged on the main body part release film 503.

Step 2. the flexible printed circuit 41 on the light bar 4 is attached to the main body part 50 on the light bar fixing tape 5 to form the light bar assembly.

Figure 9:
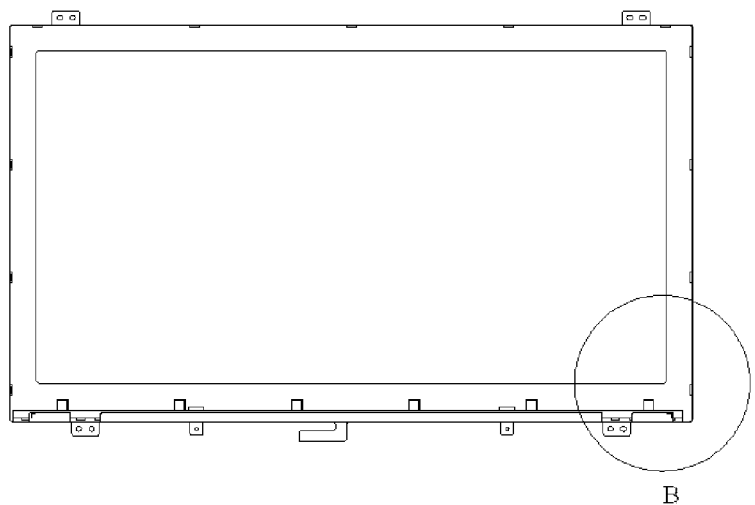
FIG. 9 is another schematic diagram of assembly of a backlight in an embodiment of the present invention.
Figure 10:
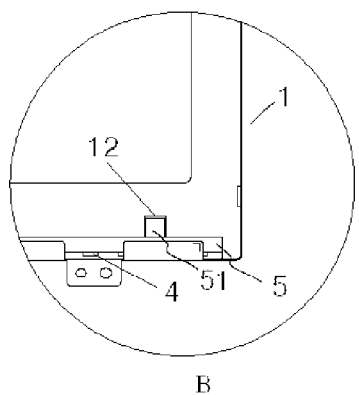
FIG. 10 is an enlarged view of a part B in FIG. 9.

Step 3. the light bar assembly is put in the groove-shaped area defined by the flat panel part 10, the first side wall of the bent part 11 and the second side wall of the bent part 11, the boundaries of the main body part 50 and the extension parts 51 on the light bar fixing tape 5 are aligned with the edges of all the through holes 12 on the backplane 1 close to the first side wall of the bent part 11, moreover, the distances from the two opposite side edges of each extension part 51 to the corresponding inner edges of the corresponding through hole 12 are equal to each other, as shown in FIG. 9 and FIG. 10.

Figure 11:
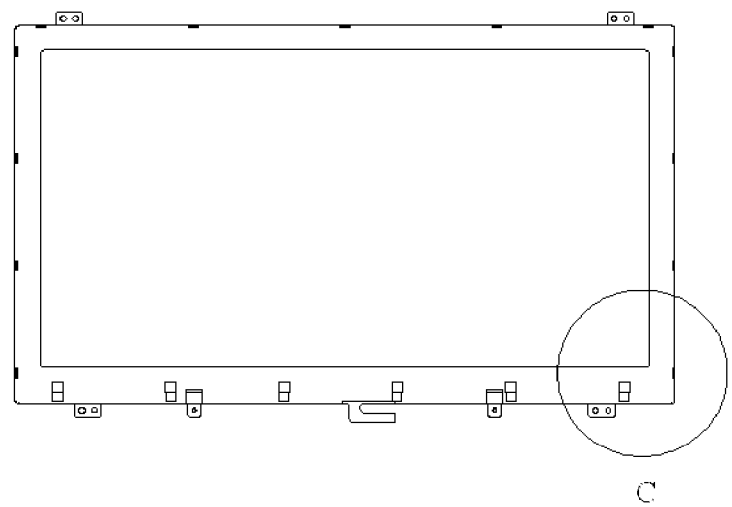
FIG. 11 is a schematic diagram of a back surface of a backlight after a light bar is assembled.
Figure 12:
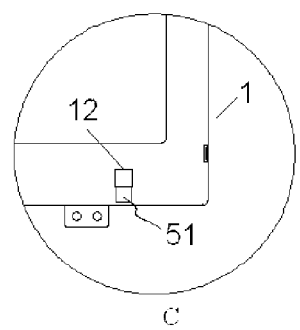
FIG. 12 is an enlarged view of a part C in FIG. 11.

Step 4. each extension part 51 is turned over and attached to the back surface of the backplane 1 after penetrating through the corresponding through hole 12, then all the extension part release films 513 are torn off to attach all the extension parts 51 to the back surface of the backplane 1 to finish the fixing process of the light bar 4, as shown in FIG. 11 and FIG. 12.

Similarly, a grabbing part exceeding the corresponding extension part 51 for about 2-3 mm is arranged on each extension part release film 513, in order to conveniently tear off the release film.

According to the embodiment of the present invention, the plurality of extension parts 51 on the light bar fixing tape 5 are matched with the plurality of through holes 12 on corresponding positions on the backplane 1 to attach the light bar 4 to the backplane 1, such that the light bar 4 is positioned more accurately and conveniently. Moreover, in the embodiment of the present invention, since no additional jig is necessary for positioning, the assembly efficiency of the backlight is improved, and under the condition that the light bar 4 needs to be detached to repair the backlight, the damage risk of the light bar 4 can be greatly reduced and the cost is saved.

It can be understood that, the above implementations are merely exemplary implementations adopted for describing the principle of the present invention, rather than limiting the present invention. Those of ordinary skill in the art can make various variations and improvements without departing from the spirit and essence of the present invention, and these variations and improvements are encompassed within the protection scope of the present invention.

The invention claimed is:

1. A light bar assembly, comprising a light bar and a light bar fixing tape arranged on a back surface of the light bar, wherein the light bar fixing tape comprises a main body part and a plurality of extension parts extending out from the main body part, the main body part is attached to a flexible printed circuit board on the light bar, the plurality of extension parts are configured to be attached to a backplane of a backlight to be assembled,
wherein, before the main body part is attached to the flexible printed circuit board on the light bar, the light bar fixing tape further comprises a main body part release film and a plurality of extension part release films, which are mutually independent, the main body part release film is arranged on a surface of the main body part to be attached to the flexible printed circuit board, and the plurality of extension part release films are respectively arranged on surfaces of the plurality of extension parts to be attached to the backplane, and
wherein, after the main body part is attached to the flexible printed circuit board on the light bar, the main body part release film is removed, whereas the plurality extension part release films are not removed.

2. The light bar assembly of claim 1, wherein the main body part is strip-shaped, and the main body part has a width equal to that of the flexible printed circuit board.

3. The light bar assembly of claim 1, wherein grabbing parts are arranged on the main body part release film and the plurality of extension part release films, respectively.

4. The light bar assembly of claim 1, wherein the plurality of extension parts are uniformly distributed at preset intervals on a same side of the main body part.

5. The light bar assembly of claim 2, wherein the plurality of extension parts are uniformly distributed at preset intervals on a same side of the main body part.

6. The light bar assembly of claim 3, wherein the plurality of extension parts are uniformly distributed at preset intervals on a same side of the main body part.

7. The light bar assembly of claim 1, wherein each extension part is provided with a chamfered structure at junction of the extension part and the main body part.

8. A backlight, comprising a backplane and a light bar assembly, wherein,
the light bar assembly comprises a light bar and a light bar fixing tape arranged on a back surface of the light bar, wherein the light bar fixing tape comprises a main body part and a plurality of extension parts extending out from the main body part, the main body part is attached to a flexible printed circuit board on the light bar, the plurality of extension parts are configured to be attached to the backplane, wherein, before the main body part is attached to the flexible printed circuit board on the light bar and the plurality of extension parts are attached to the backplane, the light bar fixing tape further comprises a main body part release film and a plurality of extension part release films, which are mutually independent, the main body part release film is arranged on a surface of the main body part to be attached to the flexible printed circuit board, and the plurality of extension part release films are respectively arranged on surfaces of the plurality of extension parts to be attached to the backplane, wherein, after the main body part is attached to the flexible printed circuit board on the light bar, the main body part release film is removed, whereas the plurality of extension part release films are not removed; and
a plurality of through holes one-to-one corresponding to positions of the plurality of extension parts are formed on the backplane, and each extension part penetrates through the corresponding through hole and is attached to the back surface of the backplane, wherein, after the plurality of extension parts are attached to the backplane, the plurality of extension part release films are removed.

9. The backlight of claim 8, wherein the main body part is strip-shaped, and the main body part has a width equal to that of the flexible printed circuit board.

10. The backlight of claim 8, wherein grabbing parts are arranged on the main body part release film and the plurality of extension part release films, respectively.

11. The backlight of claim 8, wherein the plurality of extension parts are uniformly distributed at preset intervals on a same side of the main body part.

12. The backlight of claim 9, wherein the plurality of extension parts are uniformly distributed at preset intervals on a same side of the main body part.

13. The backlight of claim 10, wherein the plurality of extension parts are uniformly distributed at preset intervals on a same side of the main body part.

14. The backlight of claim 8, wherein each extension part is provided with a chamfered structure at junction of the extension part and the main body part.

15. The backlight of claim 8, wherein the backplane comprises a flat panel part and a bent part arranged on the flat panel part and bent towards a central area of the flat panel part, the bent part comprises a first side wall and a second side wall, the first side wall is connected with the flat panel part, and the second side wall is connected with the first side wall, such that the flat panel part, the first side wall and the second side wall define a groove-shaped area together, the plurality of through holes are formed at positions on an edge of the flat panel part close to the bent part, and the light bar is located in the groove-shaped area.

16. The backlight of claim 15, wherein the shortest distance from an edge of each through hole close to the first side wall to the bottom of the first side wall is the same, and the distance is equal to a width of the main body part and a width of the flexible printed circuit board.

17. The backlight of claim 16, wherein each through hole is a rectangle with a first length and a first width, each extension part is a rectangle with a second length and a second width, the second length is smaller than the first length, and the second width is smaller than the first width.

18. The backlight of claim 17, wherein the first length is 5.0-5.5 mm, the first width is 5.0-5.5 mm, the second length is 4.5-5.0 mm, and the second width is 4.5-5.0 mm.

19. The backlight of claim 17, wherein each extension part comprises two opposite side edges, and distances from the two side edges to corresponding inner edges of the corresponding through hole are equal to each other.

20. The backlight of claim 18, wherein each extension part comprises two opposite side edges, and distances from the two side edges to corresponding inner edges of the corresponding through hole are equal to each other.

\* \* \* \* \*